United States Patent
Ger et al.

(10) Patent No.: US 7,545,106 B2
(45) Date of Patent: Jun. 9, 2009

(54) DISCHARGE LAMP DRIVING DEVICE AND DRIVING METHOD

(75) Inventors: Chih-Chan Ger, Shenzhen (CN); Chia-Ming Chang, Tu-Cheng (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 67 days.

(21) Appl. No.: 11/309,213

(22) Filed: Jul. 13, 2006

(65) Prior Publication Data
US 2007/0090774 A1 Apr. 26, 2007

(30) Foreign Application Priority Data
Oct. 25, 2005 (CN) .................... 2005 1 0100765

(51) Int. Cl.
*H05B 37/02* (2006.01)
(52) U.S. Cl. .................. 315/307; 315/291; 315/224; 315/276; 315/312; 345/102
(58) Field of Classification Search ................ 315/308, 315/307, 224, 291, DIG. 4, 209 R, 219, 268, 315/274, 276, 246, 247, 312, DIG. 7; 345/102
See application file for complete search history.

(56) References Cited

U.S. PATENT DOCUMENTS

| | | | | |
|---|---|---|---|---|
| 5,615,093 A * | 3/1997 | Nalbant | ........................ | 315/307 |
| 5,828,178 A | 10/1998 | York et al. | ................... | 315/151 |
| 5,930,121 A * | 7/1999 | Henry | ......................... | 315/307 |
| 6,008,593 A * | 12/1999 | Ribarich | ...................... | 315/307 |
| 6,072,283 A | 6/2000 | Hedrei et al. | ................ | 315/307 |
| 6,515,881 B2 * | 2/2003 | Chou et al. | .................. | 315/308 |
| 6,531,835 B2 | 3/2003 | Chen et al. | ................... | 315/307 |
| 7,030,570 B2 * | 4/2006 | Alexandrov | ................. | 315/224 |
| 2003/0160572 A1 * | 8/2003 | Wells et al. | .................. | 315/224 |
| 2004/0217719 A1 * | 11/2004 | Higuchi | ........................ | 315/312 |

FOREIGN PATENT DOCUMENTS

| KR | 10-2005-0000992 | 1/2005 |
|---|---|---|
| TW | 450504 | 8/2001 |

* cited by examiner

*Primary Examiner*—Douglas W Owens
*Assistant Examiner*—Ephrem Alemu
(74) *Attorney, Agent, or Firm*—Wei Te Chung

(57) ABSTRACT

A discharge lamp driving device for driving a lamp module (23) including a plurality of lamps includes a switch circuit (21), a transformer and filter circuit (22), and a microcontroller (20). The switch circuit converts a received signal to an alternating current signal. The transformer and filter circuit is connected between the switch circuit and the lamp module, for amplifying and shaping the alternating current signal. The microcontroller connected to the switch circuit for outputting a control signal to control the switch circuit to output the alternating current signal to the lamp module. In the invention, correlative parameters and specifications of the circuit are predetermined via the microcontroller. Therefore, the structure of the whole circuit is simple.

18 Claims, 10 Drawing Sheets

US 7,545,106 B2

DISCHARGE LAMP DRIVING DEVICE AND DRIVING METHOD

FIELD OF THE INVENTION

The present invention relates to a discharge lamp driving device, and particularly to a discharge lamp driving device typically used for driving a plurality of lamps in a backlight module of a liquid crystal display (LCD).

DESCRIPTION OF RELATED ART

Generally, discharge lamps used as light sources of a liquid crystal display (LCD) panel have a terminal voltage characteristic that varies according to the frequencies of alternating current applied to the discharge lamps. The discharge lamps also exhibit a negative impedance characteristic whereby the impedance decreases upon an increase in input power. The circuit should be configured with a controllable alternating current power supply and a feedback circuit for stable operation.

A conventional device for driving a plurality of discharge lamps normally requires a pulse width modulation (PWM) controller, for adjusting current flowing through the discharge lamps. The PWM controller and peripheral protecting circuits thereof ensure the discharge lamp driving device works normally.

FIG. 10 is a block diagram of a conventional discharge lamp driving device. The conventional discharge lamp driving device includes a PWM controller 10, a switch circuit 11, a transformer and filter circuit 12, a lamp module 13, a feedback circuit 14, a voltage divider circuit 15, a protecting circuit 16, and an input voltage protecting circuit 17. The PWM controller 10 controls output of the switch circuit 11 in accordance with a feedback signal output from the feedback circuit 14, and adjusts current flowing through the lamp module 13 via the transformer and filter circuit 12. The voltage divider circuit 15 and the protecting circuit 16 are connected, and respectively connected to the transformer and filter circuit 12 and the PWM controller 10. The voltage divider circuit 15 and the protecting circuit 16 protect the lamp module 13 from receiving too much voltage. The input voltage protecting circuit 17 is connected to the PWM controller 10, for detecting whether the input voltage is normal, and for ensuring the discharge lamp driving device is working normally.

Conventionally, the discharge lamp driving device adjusts the current flowing through the lamp module 13 via the PWM controller 10. Normally, the PWM controller 10 is a chip, and some parameters thereof, such as a frequency range, a maximum duty cycle and so on, are fixed. Therefore, the PWM controller 10 restricts circuit design. In addition, different discharge lamp driving devices have different requirements for the PWM controller 10. One solution for the problem is using more components, which may lead to bad performance of the discharge lamp driving device.

SUMMARY OF THE INVENTION

One aspect of the present invention provides a discharge lamp driving device for driving a lamp module which includes a switch circuit, a transformer and filter circuit, and a microcontroller. The switch circuit converts a received signal to an alternating current signal The transformer and filter circuit is connected between the switch circuit and the lamp module, and used for amplifying and shaping the alternating current signal. The microcontroller is connected to the switch circuit for outputting a control signal to control the alternating current signal to the lamp module.

The microcontroller includes an analog/digital converter, a PWM control module, a dimming control module, and a signal synthesizing module. The analog/digital converter converts received analog signals to digital signals. The protecting module compares the digital signals with predetermined values, and outputs a protecting control signal. The PWM control module receives one of the digital signals and provides a PWM signal to adjust current flowing through the lamp module. The dimming control module receives another one of the digital signals, and provides a PWM dimming control signal to adjust brightness of the lamp module. The signal synthesizing module combines the protecting control signal, the PWM current adjusting signal, and the PWM dimming control signal, into a PWM control signal, and outputs the PWM control signal to the switch circuit.

Another aspect of the present invention provides a discharge lamp driving method. The method includes the steps of: setting a driving frequency; detecting whether an input voltage is normal; gradually increasing the frequency of an output signal until the lamps are lit, if the input voltage is normal; detecting whether a feedback signal is normal; detecting conditions of the discharge lamp driving device, if the feedback signal is abnormal, and entering a normal work mode, if the feedback signal is normal.

Other advantages and novel features will become more apparent from the following detailed description when taken in conjunction with the accompanying drawings, in which:

DETAILED DESCRIPTION OF THE INVENTION

Figure 1:
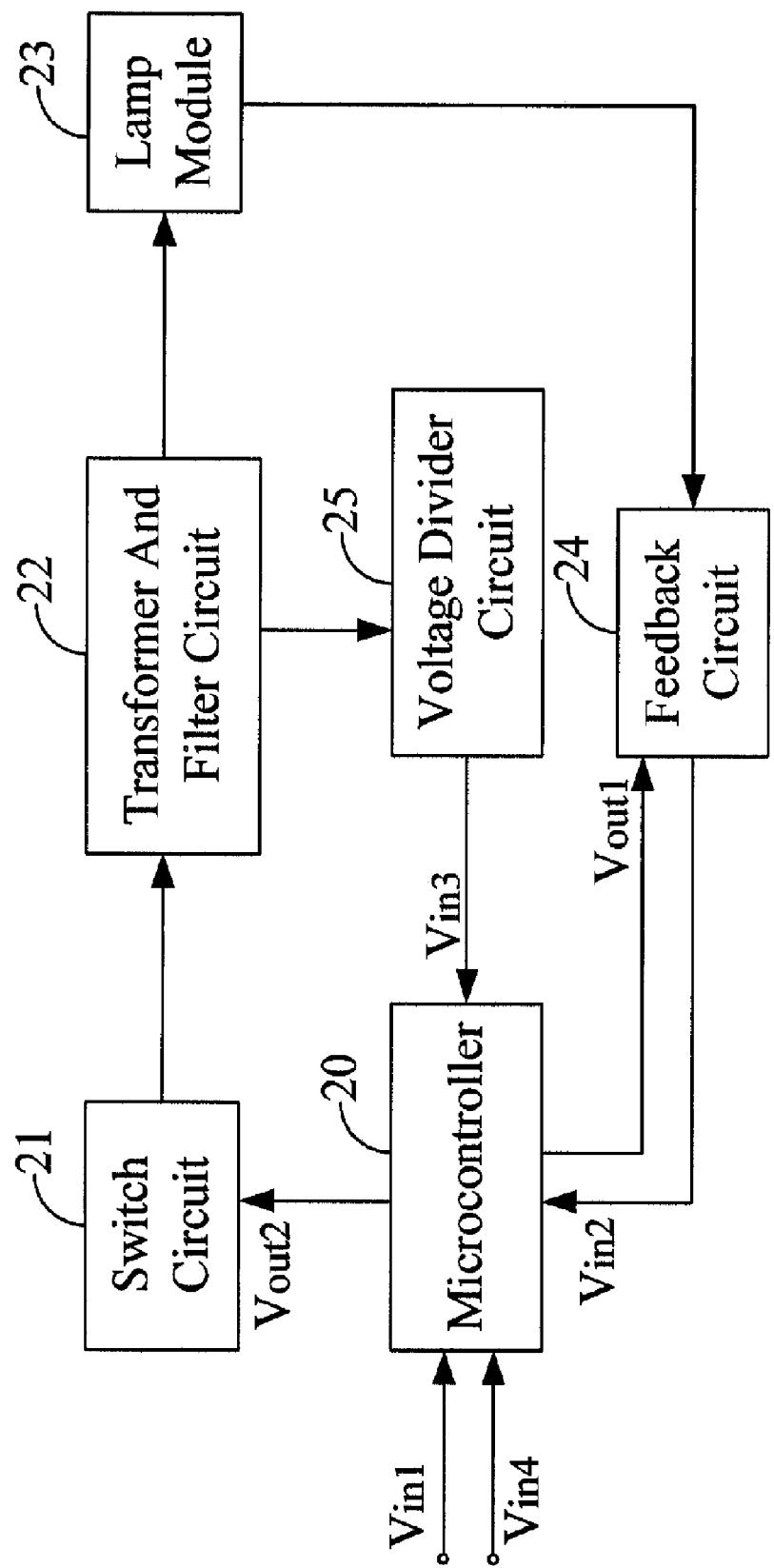
FIG. 1 is a block diagram of a discharge lamp driving device in accordance with an exemplary embodiment of the present invention, which includes a microcontroller and a feedback circuit.

FIG. 1 shows a block diagram of a discharge lamp driving device in accordance with an exemplary embodiment of the present invention. The discharge lamp driving device includes a microcontroller 20, a switch circuit 21, a transformer and filter circuit 22, a lamp module 23, a feedback circuit 24, and a voltage divider circuit 25. The lamp module 23 includes a plurality of lamps. The switch circuit 21 and the transformer and filter circuit 22 are jointly called as a driving circuit. In the exemplary embodiment, the switch circuit 21 can be a full-bridge circuit, a half-bridge circuit, a push-pull circuit, or a Royer circuit.

The switch circuit 21 converts a received signal to an alternating current (AC) signal. The transformer and filter circuit 22 is connected between the switch circuit 21 and the lamp module 23, and used for amplifying and shaping the AC signal, for example a sine signal. The feedback circuit 24 is connected between the lamp module 23 and the microcontroller 20, and provides feedback current indicating how much current flows through the lamp module 23. The microcontroller 20 is connected to the switch circuit 21, and outputs a control signal Vout2 based on an output Vin2 of the feedback circuit 24 to control the switch circuit 21 to output a desired frequency AC signal to the lamp module 23. In addition, the microcontroller 20 outputs another control signal Vout1 to control operation of the feedback circuit 24. The voltage divider circuit 25 is connected between the transformer and filter circuit 22 and the microcontroller 20, and outputs a voltage signal Vin3 to the microcontroller 20 indicating a level of voltage applied to the lamp module 23.

In the embodiment, the microcontroller 20 has a dimming control function, a current adjusting function, and a protecting function. In this way, peripheral circuits of the microcontroller 20 are reduced. In addition, correlative parameters of the microcontroller 20 can be set based on practical requirements. Thus, the microcontroller 20 has high-scalability. Furthermore, in order to meet specification requirements of different manufacturers, users are only required to modify correlative programs in the microcontroller 20, without modifying circuit structures thereof.

Figure 2:
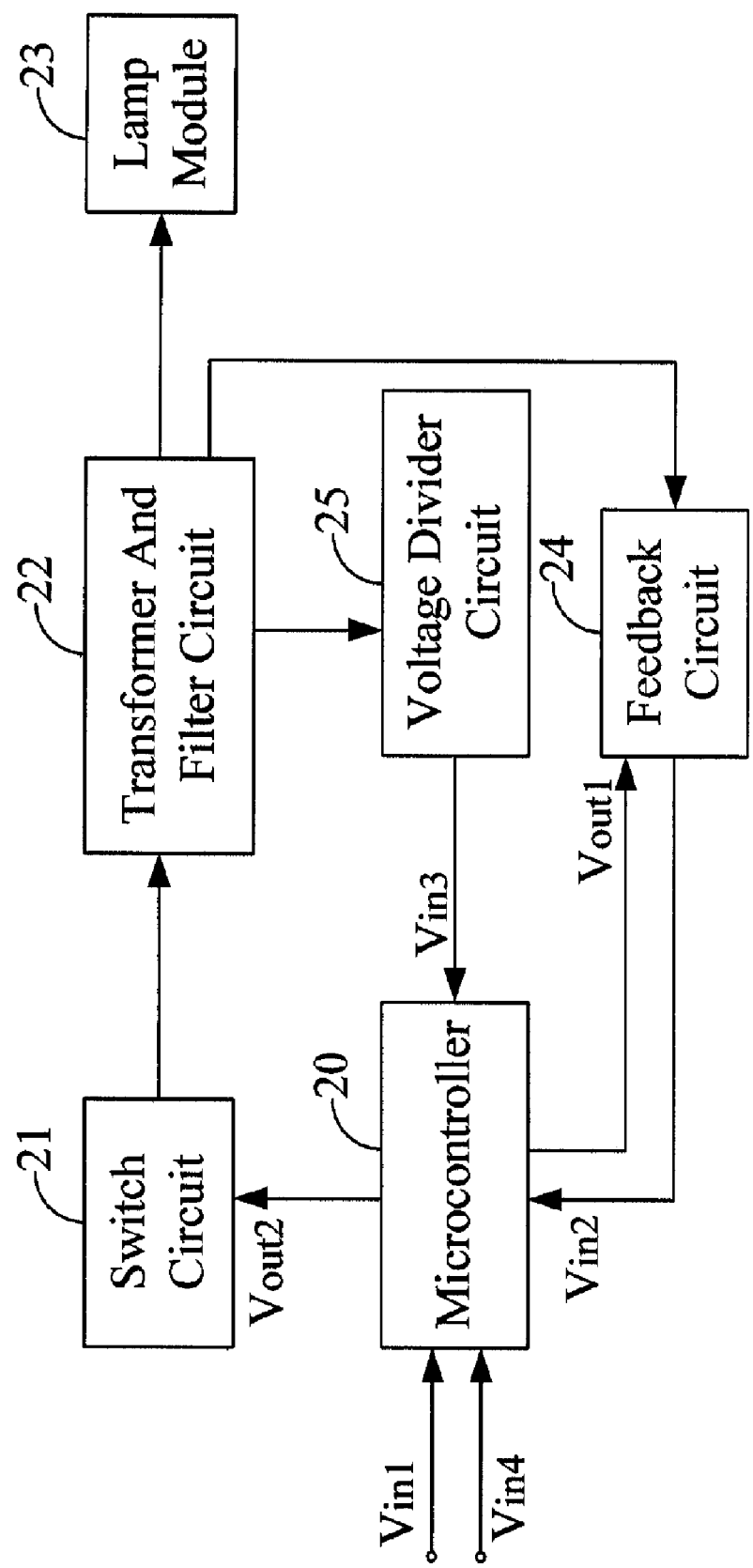
FIG. 2 is a block diagram of a discharge lamp driving device in accordance with another exemplary embodiment of the present invention, which includes the microcontroller and the feedback circuit.

FIG. 2 shows a block diagram of a discharge lamp driving device in accordance with another exemplary embodiment of the present invention. The discharge lamp driving device shown in FIG. 2 is substantially the same as that of in FIG. 1, except that the feedback circuit 24 is connected between the transformer and filter circuit 22 and the microcontroller 20.

Figure 3:
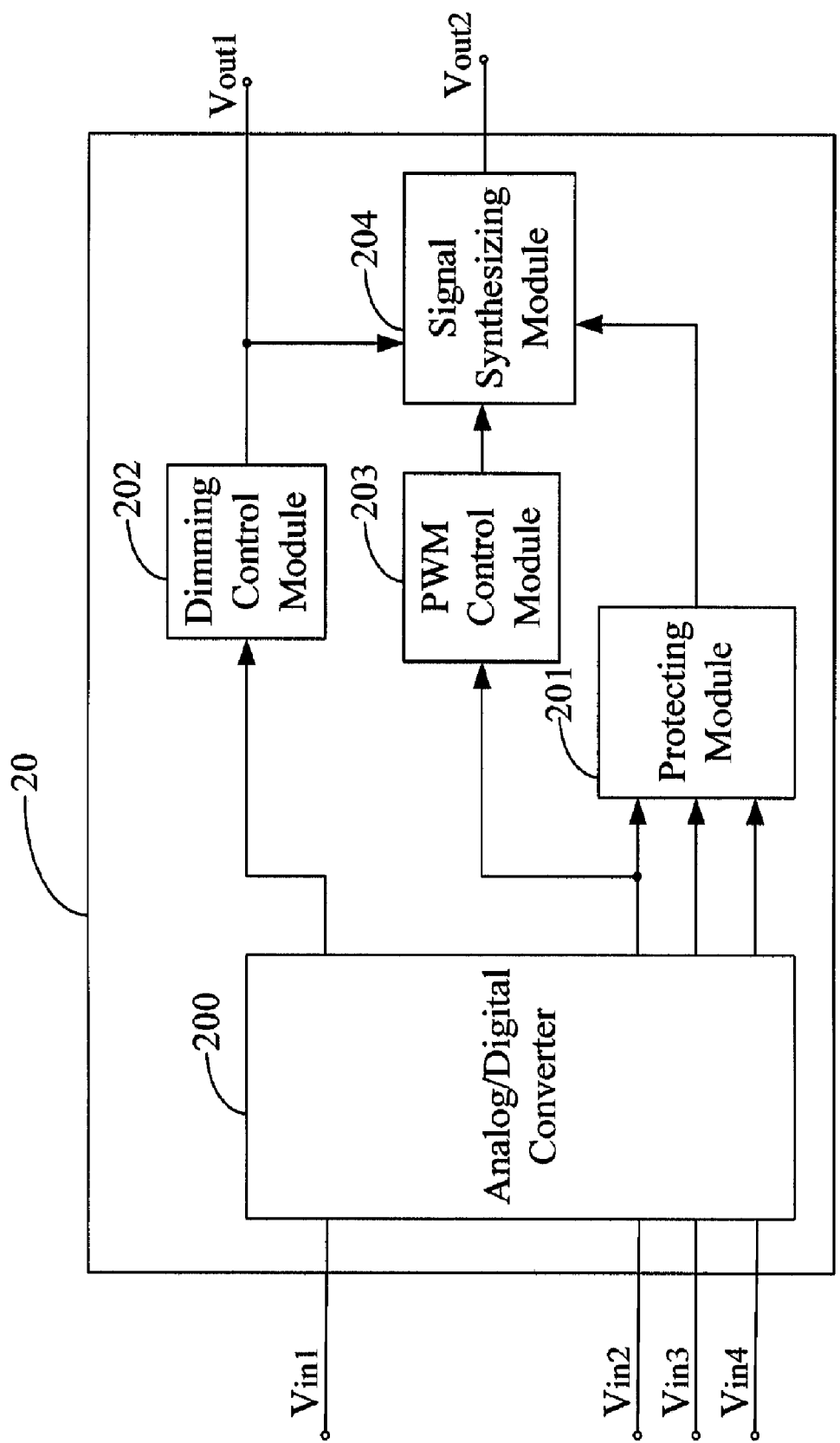
FIG. 3 is a block diagram of the microcontroller of the discharge lamp driving device of FIG. 1 and FIG. 2 in accordance with the present invention.

FIG. 3 shows a block diagram of the microcontroller 20 in accordance with the present invention. The microcontroller 20 includes an analog/digital (A/D) converter 200, a protecting module 201, a dimming control module 202, a pulse width modulation (PWM) control module 203, and a signal synthesizing module 204. In the exemplary embodiment, the microcontroller 20 has four inputs Vin1☐Vin2☐Vin3 and Vin4. Vin1 receives a dimming control signal, for example from a user-operated dimmer control (not shown). Vin2 receives a current feedback signal from the feedback circuit 24. Vin3 receives a voltage signal from the voltage divider circuit 25. Vin4 receives a temperature signal, for example from a sensor (not shown) of the lamp module 23.

The dimming control signal, the current feedback signal, the voltage signal, and the temperature signal are analog signals, which are converted to digital signals by the A/D converter 200. The dimming control module 202 generates a low frequency PWM dimming control signal Vout1 according to the digital dimming control signal, for adjusting brightness of the lamp module 23. The low frequency PWM dimming control signal Vout1 is also sent to the feedback circuit 24 to control operation of the feedback circuit 24. In the exemplary embodiment, when the low frequency PWM dimming control signal Vout1 is a logic low level, the signal synthesizing module 204 has no output, then the feedback circuit 24 does not output the feedback signal. Therefore, the microcontroller 20 controls operation of the feedback circuit 24 via the low frequency PWM dimming control signal Vout1. The PWM control module 203 generates a high frequency PWM current adjusting signal according to the digital current feedback signal, for adjusting current flowing through the lamp module 23. The protecting module 201 simultaneously receives the digital current feedback signal, the digital voltage signal, and the digital temperature signal, and compares the digital signals with individual predetermined values. Then, the protecting module 201 outputs a protecting control signal to the signal synthesizing module 204. When the digital current feedback signal, the digital voltage signal, and the digital temperature signal received from the A/D converter 200 match the predetermined values, the protecting module 201 outputs a protecting control signal to the signal synthesizing module 204, such as a logic high level. Contrarily, when the digital current feedback signal, the digital voltage signal, and the digital temperature signal received from the A/D converter 200 are do not match the predetermined values, the protecting module 201 outputs a logic low level protecting control signal to the signal synthesizing module 204.

The signal synthesizing module 204 combines the protecting control signal, the PWM current adjusting signal, and the PWM dimming control signal Vout1 into a PWM control signal Vout2 and outputs the signal Vout2 to the switch circuit 21. The PWM control signal Vout2 is derived from logically "ANDing" the protecting control signal, the PWM current adjusting signal, and the PWM dimming control signal when they are all normal, and outputting a signal to the switch circuit 21 allowing the switch circuit 21 to operate. When any of the protecting control signal, the PWM current adjusting signal, and the PWM dimming control signal are low, output of the PWM control signal Vout2 is shut off.

In the exemplary embodiment, the microcontroller 20 adjusts duty cycles of the high frequency PWM current adjusting signal output from the PWM control module 203 according to the feedback signal output from the feedback circuit 24, to adjust the brightness of the lamp module 23 and the current flowing through the lamp module 23. The effect is to turn on and turn off (alternate high and low signals) the signal synthesizing module 204 which causes the switch circuit 21 to turn on and off thus controlling the signal to sent to the lamp module 23.

Figure 4:
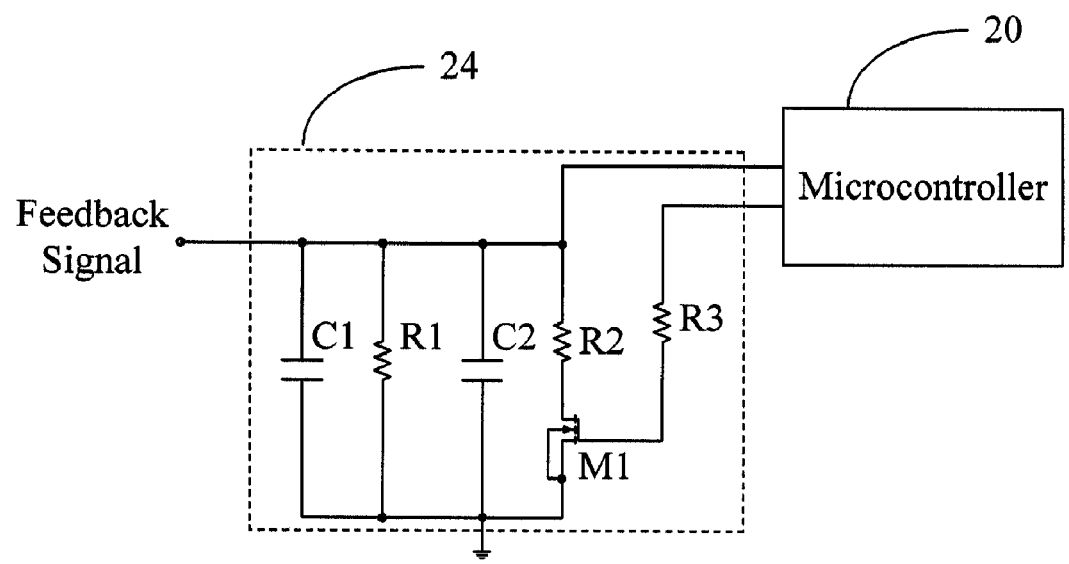
FIG. 4 is a circuit diagram of the feedback circuit of FIG. 1 and FIG. 2 in accordance with the present invention.

FIG. 4 shows a circuit diagram of the feedback circuit 24 in accordance with the present invention. The feedback circuit 24 includes a first capacitor C1, a first resistor R1, a second resistor R2 and a switch element M1. In the exemplary embodiment, the switch element M1 is a metal oxide semiconductor field effect transistor (MOSFET), which has an input end, a first output end, and a second output end. Ends of the first capacitor C1, the first resistor R1, and the second resistor R2 are connected together to the microcontroller 20, and receive the feedback signal. The other ends of the first capacitor C1 and the first resistor R1 are grounded. In the exemplary embodiment, the first resistor R1 is connected parallel with the first capacitor C1. The input end of the MOSFET M1 is electronically connected to the microcontroller 20, and receives the low frequency PWM dimming control signal Vout1. The first output end of the MOSFET M1 is connected to the other end of the second resistor R2, and the second output end of the MOSFET M1 is grounded.

In the exemplary embodiment, when the feedback circuit 24 forwards the feedback signal to the microcontroller 20, the MOSFET M1 is on. The first resistor R1 and the second resistor R2 rapidly charge the first capacitor C1. When the feedback circuit 24 does not output the feedback signal to the microcontroller 20, the MOSFET M1 is off. The first resistor R1 then slows discharging of the first capacitor C1. Therefore, when the low frequency PWM dimming control signal Vout1 is at the transformation period of the logic high level to the logic low level, the high frequency PWM current adjusting signal of the PWM control signal Vout2 changes slowly, ensuring stability of the discharge lamp driving device.

In exemplary embodiment, the feedback circuit 24 also includes a second capacitor C2 and a third resistor R3. The second capacitor C2 is connected parallel with the first capacitor C1, and provided as a filter. The third resistor R3 is disposed between the microcontroller 20 and the input end of the MOSFET M1, for limiting current flowing through the MOSFET M1. In the exemplary embodiment, value of the first capacitor C1 is greater than that of the second capacitor C2.

In the exemplary embodiment, a dimming control mode of the discharge lamp driving device is a burst dimming mode, namely a discontinuous dimming mode. In order to ensure the discharge lamp driving device works steadily when the low frequency PWM dimming control signal Vout1 changes at the transformation period of the logic high level to the logic low level, the duty cycles of the high frequency PWM current adjusting signal increases or decreases in a gradually variable manner.

In the exemplary embodiment, the lamp module 23 enters a starting mode before entering a normal work mode. That is, the microcontroller 20 starts outputting a low frequency signal to the switch circuit 21. Then, the microcontroller 20 gradually increases the frequency signal until lamps of the lamp module 23 light, and the frequency at which the lamps light is referred to as a starting frequency. After the lamps of the lamp module 23 are lit, the microcontroller 20 outputs a driving frequency to the switch circuit 21. The driving frequency is lower than the starting frequency. In the exemplary embodiment, there are three ways in which the microcontroller 20 may find the correct starting frequency: gradually varying output frequencies over a predetermined frequency range to find the starting frequency, varying output frequencies by predetermined steps, or increasing the duty cycles of the switch circuit 21 at one fixed predetermined frequency.

Figure 5:
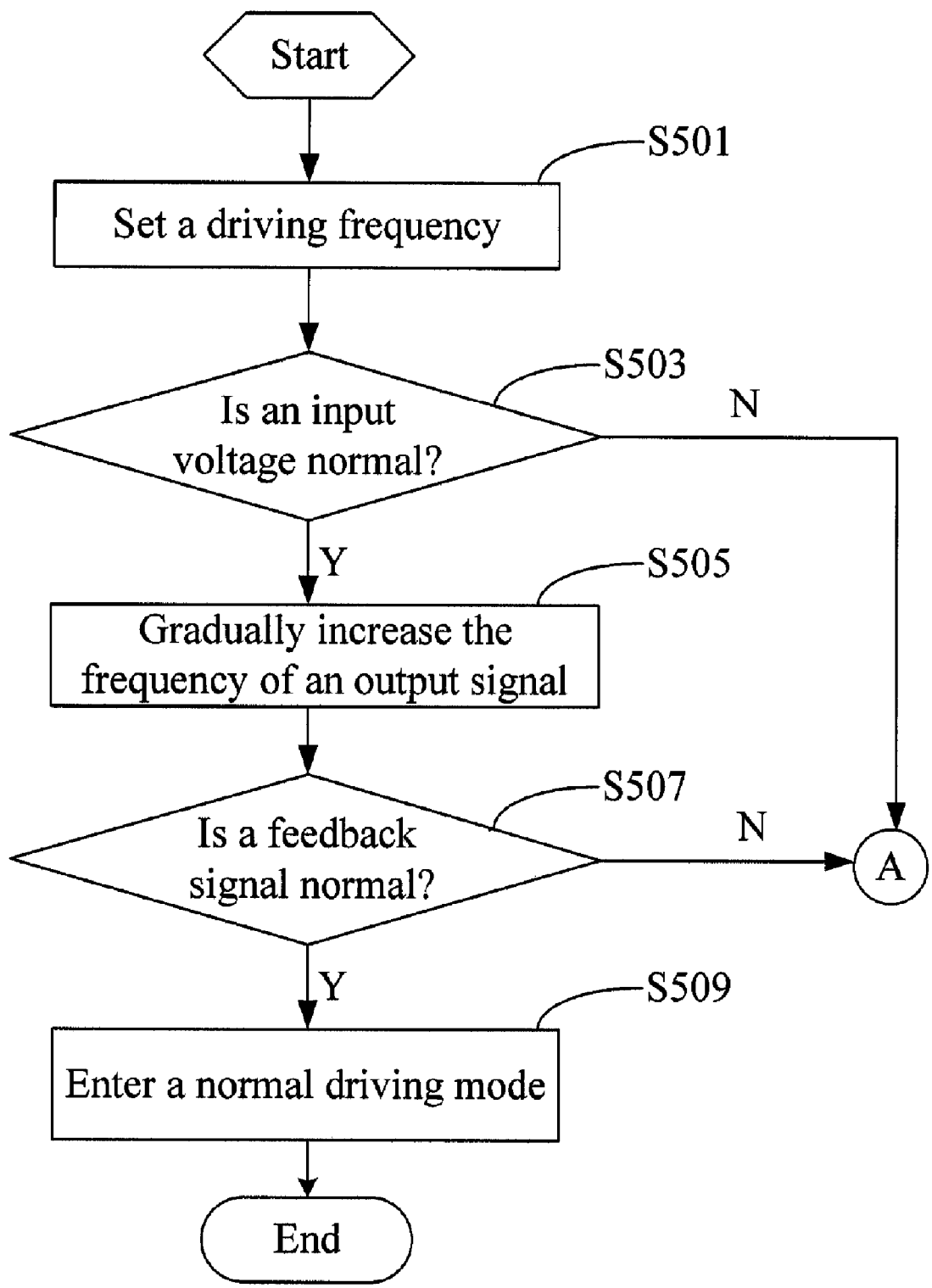
FIG. 5 is a flow chart of a discharge lamp driving method in accordance with an exemplary embodiment of the present invention.

FIG. 5 shows a flow chart of a discharge lamp driving method in accordance with an exemplary embodiment of the present invention.

At step S501, a microcontroller 20 sets a driving frequency for a lamp module.

At step S503, the microcontroller 20 detects whether an input voltage is normal. If the input voltage is abnormal, the microcontroller 20 detects conditions of the discharge lamp driving device (see FIG. 9).

At step S505, the microcontroller 20 gradually increases the frequency of an output signal until the lamps are lit, if the input voltage is normal. In the exemplary embodiment, applying a low frequency AC signal and gradually increasing the frequency of an output signal until the lamps are lit thus allowing a variety of lamps with specification requirements of different manufacturers to be used in the same fixture. For example, all 800V:50 KHz lamps, or all 900V:60 kHz lamps. Therefore, users are only required to modify correlative programs in the microcontroller 20, without modifying circuit structures thereof.

At step S507, the microcontroller 20 detects whether the feedback signal is normal. If the feedback signal is abnormal, the microcontroller 20 detects the conditions of the discharge lamp driving device (see FIG. 9).

At step S509, if the feedback signal is normal, that is, the lamp module 23 is lit, the microcontroller 20 enters a normal driving mode.

Figure 6:
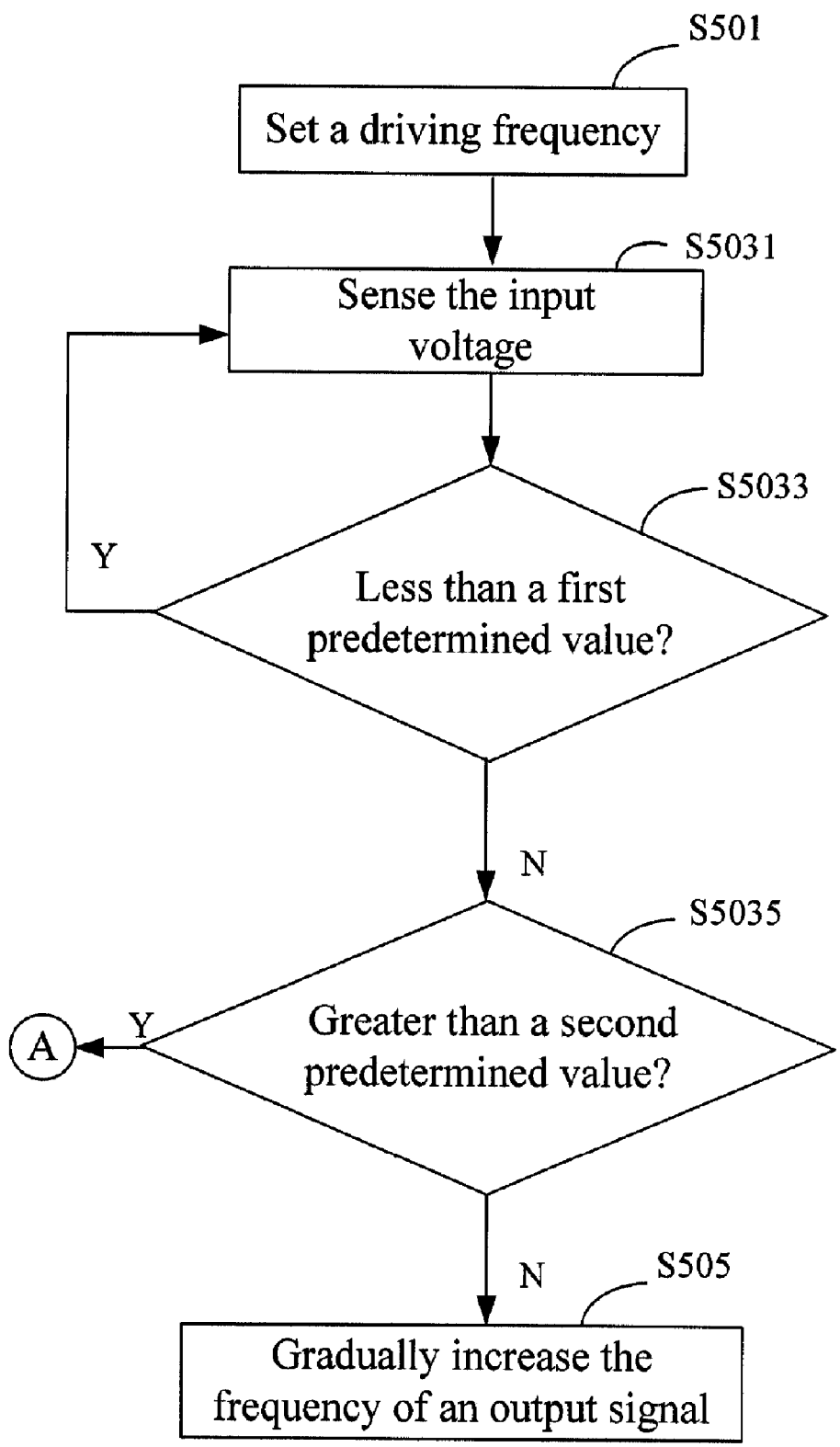
FIG. 6 is a detailed flow chart of a step S503 of FIG. 5.

FIG. 6 shows a detailed flow chart of the step S503 shown in FIG. 5. At step S5031, the microcontroller 20 continuously senses the input voltage.

At step S5033, the microcontroller 20 determines whether the input voltage is less than a first predetermined value. In the exemplary embodiment, the first predetermined value is a minimum value of the input voltage when the discharge lamp driving device works normally. If the input voltage is less than the first predetermined value, the process returns to step S5031.

At step S5035, if the input voltage is greater than the first predetermined value, the microcontroller 20 determines whether the input voltage is greater than a second predetermined value. In the exemplary embodiment, the second predetermined value is a maximum value of the input voltage when the discharge lamp driving device works normally. If the input voltage is greater than the second predetermined value, the microcontroller 20 detects the conditions of the discharge lamp driving device (see FIG. 9).

At step S505, if the input voltage is less than the second predetermined value, the microcontroller 20 gradually increases the frequency of an output signal until the lamps are lit. In the exemplary embodiment, the first predetermined value is less than the second predetermined value, and both of them are set in the microcontroller 20.

Figure 7:
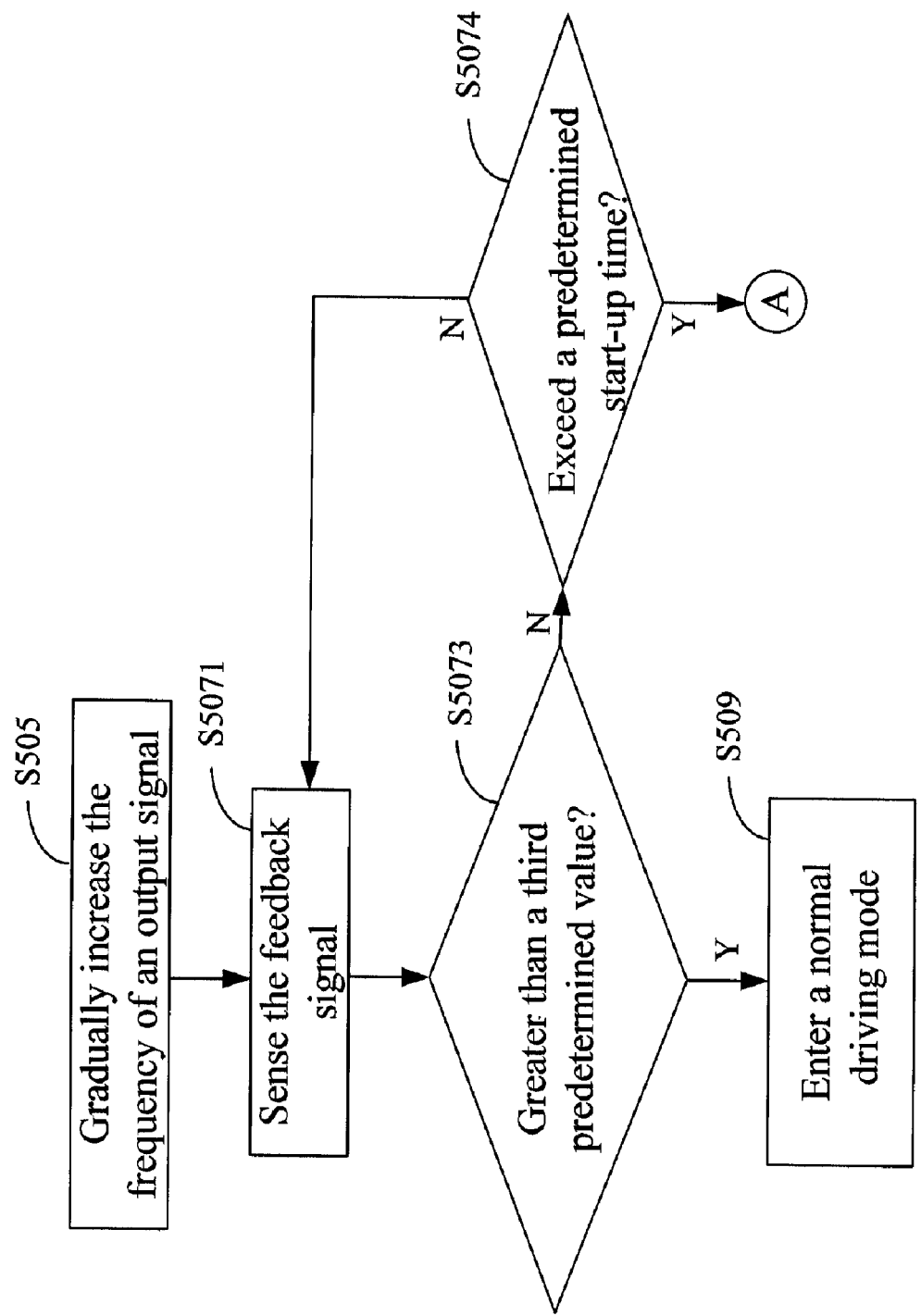
FIG. 7 is a detailed flow chart of a step S507 of FIG. 5.

FIG. 7 shows a detailed flow chart of the step S507 shown in FIG. 5.

At step S5071, the microcontroller senses the feedback signal.

At step S5073, the microcontroller 20 determines whether the feedback signal is greater than a third predetermined value. In the exemplary embodiment, the third predetermined value is a minimum current value when the lamp module 23 works normally.

If the feedback signal is greater than the third predetermined value, at step S509, the microcontroller 20 enters the normal driving mode.

If the feedback signal is less than the third predetermined value, at step S5074, the microcontroller 20 determines whether a sensing time exceeds a predetermined start-up time. If the sensing time doesn't exceed the predetermined start-up time, the microcontroller 20 returns the step S5071. If the sensing time does exceed the predetermined start-up time, the microcontroller 20 detects the conditions of the discharge lamp driving device (see FIG. 9).

Figure 8:
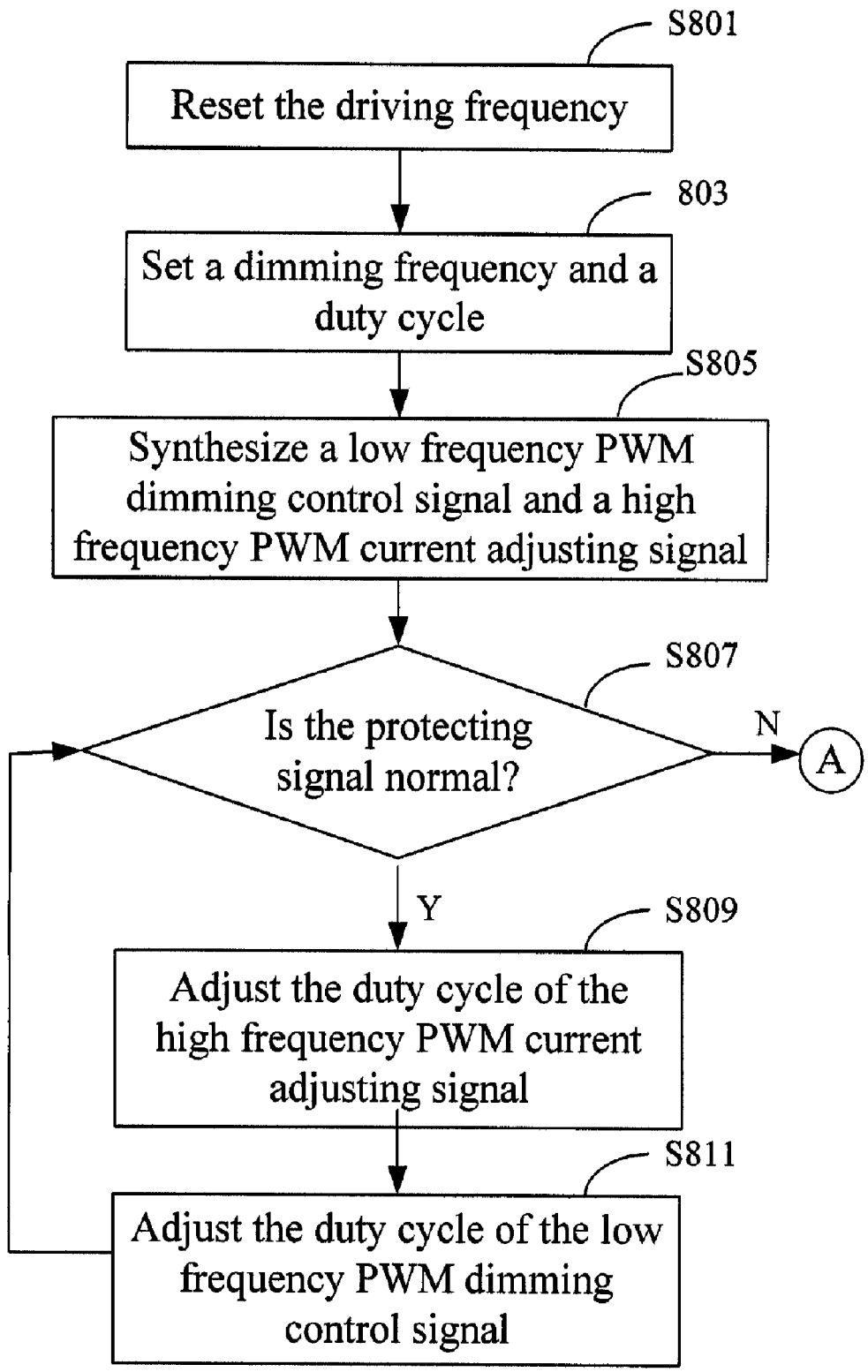
FIG. 8 is a detailed flow chart of a step S509 of FIG. 5.

FIG. 8 shows a detailed flow chart of the step S509 shown in FIG. 5.

At step S801, the microcontroller 20 resets the starting frequency to the driving frequency.

At step S803, the dimming control module 202 sets a dimming frequency and a duty cycle. In the exemplary embodiment, the dimming frequency is a low frequency.

At step S805, the signal synthesizing module 204 synthesizes a low frequency PWM dimming control signal with a high frequency PWM current adjusting signal.

At step S807, the protecting module 201 detects whether the protecting signal is normal, that is, the protecting module 201 detects whether the digital current feedback signal, the digital voltage signal, and the digital temperature signal match predetermined values. If the protecting signal is abnormal, that is, one of the digital current feedback signal, the digital voltage signal, and the digital temperature signal does not match the predetermined values, the microcontroller 20 detects the conditions of the discharge lamp driving device (see FIG. 9).

At step S809, if the protecting signal is normal, the microcontroller 20 adjusts the duty cycle of the high frequency PWM current adjusting signal according to the feedback signal.

At step S811, the microcontroller adjusts the duty cycle of the low frequency PWM dimming control signal according to an external dimming control signal. In the exemplary embodiment, the protecting module 201 continuously detects whether the protecting signal is normal. The microcontroller 20 returns to the step S807 after performing the step S811.

Figure 9:
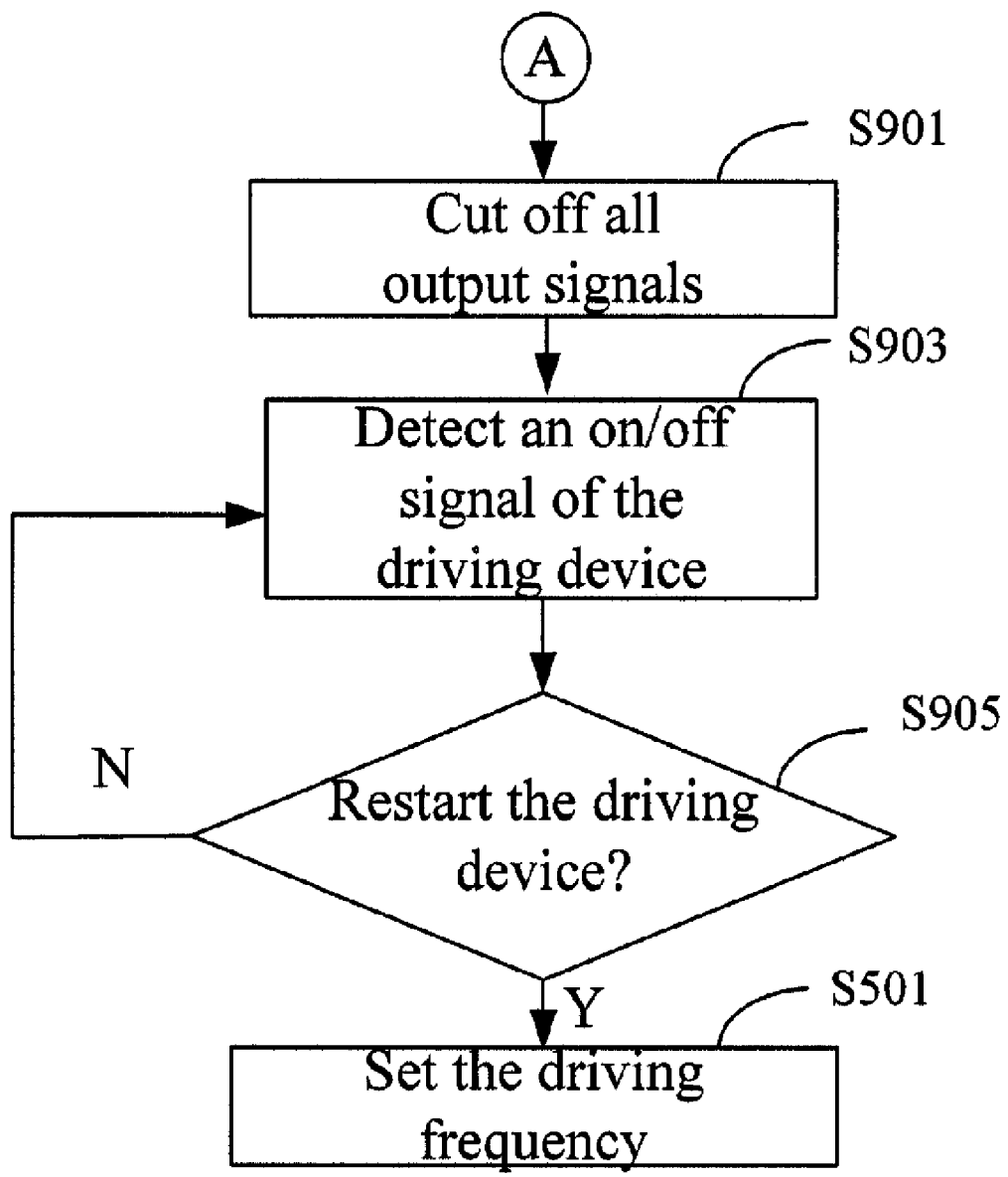
FIG. 9 is a detailed flow chart of a step of detecting the condition of the discharge lamp driving device.
Figure 10:
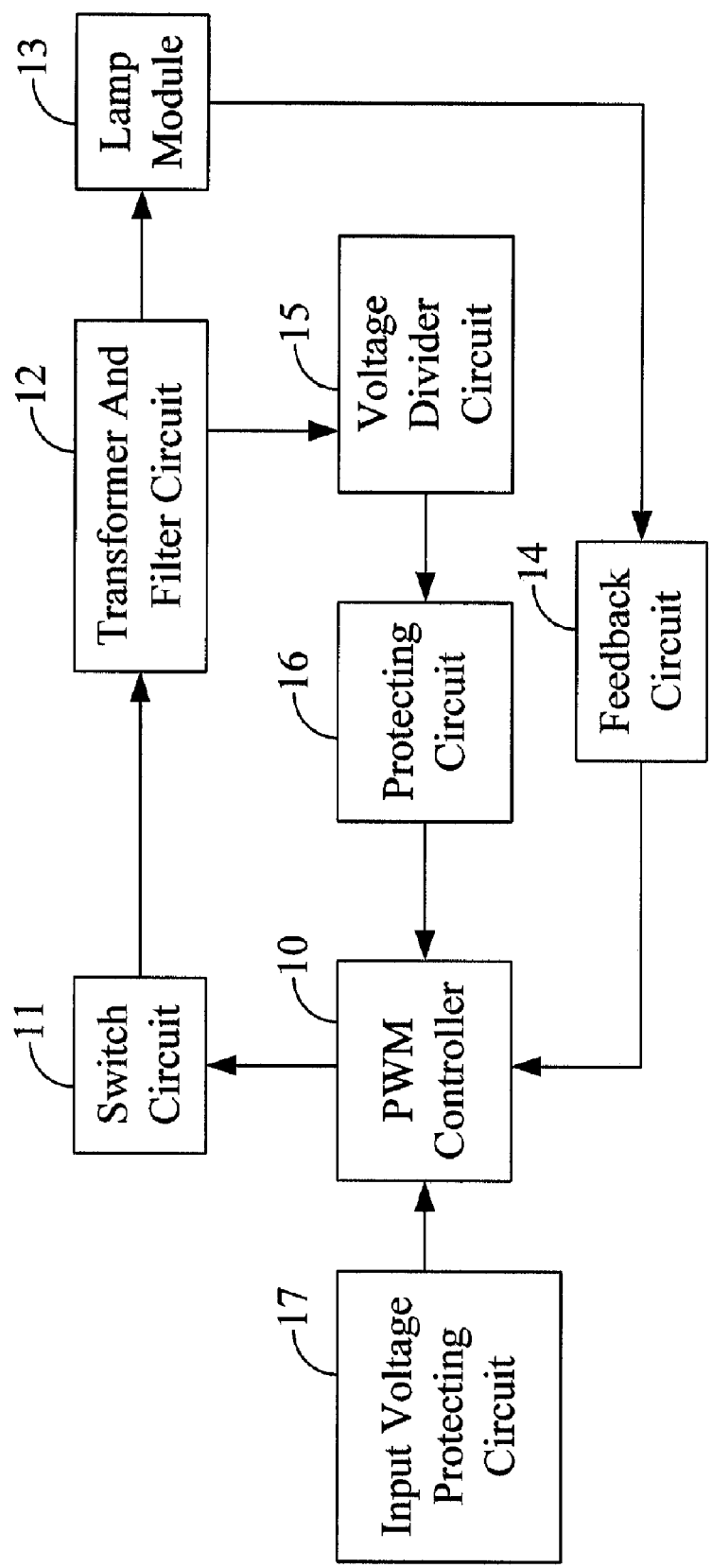
FIG. 10 is a block diagram of a conventional discharge lamp driving device.

FIG. 9 shows a detailed flow chart of step of detecting the condition of the discharge lamp driving device.

At step S901, the microcontroller 20 cuts all the output signals.

At step S903, the microcontroller 20 detects an on/off signal of the discharge lamp driving device. The on/off signal of the discharge lamp driving device is an external signal. When the microcontroller 20 detects an on signal of the discharge lamp driving device, the microcontroller 20 restarts the discharge lamp driving device. When the microcontroller 20 detects an off signal of the discharge lamp driving device, the microcontroller 20 shuts off the discharge lamp driving device.

At step S905, the microcontroller 20 determines whether the discharge lamp driving device is restarted. If the discharge lamp driving device is not restarted, the microcontroller 20 returns to the step S903 of detecting the on/off signal of the discharge lamp driving device. If the discharge lamp driving device is restarted, the microcontroller 20 returns to the step S501 of setting the driving frequency.

In the invention, correlative parameters and specifications of the circuit are predetermined via the microcontroller 20. Therefore, the structure of the whole circuit is simple.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalent.

What is claimed is:

1. A discharge lamp driving device for driving a lamp module comprising a plurality of lamps, comprising:
a switch circuit, for convening a received signal to an alternating current signal;
a transformer and filter circuit, connected between the switch circuit and the lamp module, and used for amplifying and shaping the alternating current signal; and
a microcontroller, connected to the switch circuit, for outputting a control signal to control the switch circuit to output the alternating current signal to the lamp module, the microcontroller comprising:
an analog/digital converter for converting received analog signals to digital signals;
a protecting module, for comparing the digital signals with predetermined values, and outputting a protecting control signal;
a PWM control module, for receiving one of the digital signals, and providing a PWM signal to adjust current flowing through the lamp module;
a dimming control module, for receiving another of the digital signals, and providing a PWM dimming control signal to adjust brightness of the lamp module; and
signal synthesizing module, for combining the protecting control signal, the PWM current adjusting signal, and the PWM dimming control signal into a PWM control signal, and outputting the PWM control signal to the switch circuit.

2. The discharge lamp driving device as claimed in claim 1, further comprising a voltage divider circuit, connected between the transformer and filter circuit and the microcontroller, for outputting a voltage signal to the microcontroller indicating a level of voltage applied to the lamp module.

3. The discharge lamp driving device as claimed in claim 1, wherein the PWM dimming control signal is output to the feedback circuit.

4. The discharge lamp driving device as claimed claim 1, further comprising a feedback circuit for feeding back current indicating how much current flows through the lamp module to the microcontroller, the feedback circuit electrically connectable between the microcontroller and a selective one of the lamp module and the transformer and filter circuit.

5. The discharge lamp driving device as claimed in claim 4, wherein the feedback circuit comprises:
a first capacitor having one end connected to the microcontroller, and the other end grounded;
a first resistor connected parallel with the first capacitor;
a second resistor having one end connected to the microcontroller; and a switch element having an input end, a first output end, and a second output end, wherein the input end is electronically connected to the microcontroller, the first output end is connected to the other end of the second resistor, and the second output end is grounded.

6. A method for driving a lamp module comprising a plurality of lamps, and for utilization in a discharge lamp driving device, comprising:
setting a driving frequency;
detecting whether an input voltage is normal;
gradually increasing the frequency of an output signal until the lamps are lit, if the input voltage is normal;
detecting whether a feedback signal is normal; and
entering a normal driving mode if the feedback signal is normal, the step of entering to normal driving mode comprising:
resetting the driving frequency;
setting a dimming frequency and a duty cycle;
synthesizing a low frequency PWM dimming control signal with a high frequency PWM current adjusting signal;
detecting whether the protecting signal is normal;
adjusting the duty cycle of the high frequency PWM current adjusting signal according to the feedback signal if the protecting signal is normal; and
adjusting the duty cycle of the low frequency PWM dimming control signal according to an external dimming control signal.

7. The method as claimed in claim 6, further comprising the step of detecting the conditions of the discharge lamp driving device if the protecting signal is abnormal.

8. The method as claimed in claim 6, further comprising the step of detecting conditions of the discharge lamp driving device if a preset situation happens, wherein the preset situation is selected from situations including a first situation in which the input voltage is abnormal and a second situation in which the feedback signal is abnormal.

9. The method as claimed in claim 8, wherein the step of detecting the conditions of the discharge lamp driving device comprises:
cutting all the output signals;
detecting an on/off signal of the discharge lamp driving device;
determining whether the discharge lamp driving device is restarted;
returning to the step of detecting the on/off signal of the discharge lamp driving device if the discharge lamp driving device is not restarted; and
setting the driving frequency if the discharge lamp driving device is restarted.

10. The method as claimed in claim 7, wherein the step of detecting whether the input voltage is normal comprises:
  sensing the input voltage;
  determining whether the input voltage is less than a first predetermined value; and
  determining whether the input voltage is greater than a second predetermined value if the input voltage is greater than the first predetermined value.

11. The method as claimed in claim 10, further comprising the step of sensing the input voltage if the input voltage is less than the first predetermined value.

12. The method as claimed in claim 10, further comprising the step of detecting the conditions of the discharge lamp driving device if the input voltage is greater than the second predetermined value.

13. The method as claimed in claim 10, wherein the first predetermined value is less than the second predetermined value.

14. The method as claimed in claim 6, wherein the step of determining whether the feedback signal is normal comprises:
  sensing the feedback signal;
  determining whether the feedback signal is greater than a third predetermined value; and
  determining whether a sensing time exceeds a predetermined start-up time if the feedback signal is less than the third predetermined value.

15. The method as claimed in claim 14, further comprising the step of entering the normal driving mode if the feedback signal is greater than the third predetermined value.

16. The method as claimed in claim 14, further comprising the step of sensing the feedback signal if the sensing time does not exceed the predetermined start-up time.

17. The method as claimed in claim 14, further comprising the step of detecting the conditions of the discharge lamp driving device if the sensing time does exceed the predetermined start-up time.

18. A method for steadily driving a lamp module comprising a plurality of lamps therein, comprising:
  electrically connecting a programmable microcontroller with a lamp module comprising a plurality of lamps therein through a driving circuit to drive said lamp module for illumination, and a feedback circuit to detect electrical currents passing through said lamp module for feeding back to said microcontroller;
  generating a first control signal in said microcontroller based on current feedback of said feedback circuit in order to transmit said first control signal to said driving circuit for controlling said driving circuit; and
  generating a second control signal other than said first control signal in said microcontroller in order to transmit said second control signal to said feedback circuit for controlling said feedback circuit.

* * * * *